(12) United States Patent
Kim et al.

(10) Patent No.: US 11,589,177 B2
(45) Date of Patent: Feb. 21, 2023

(54) APPARATUS FOR MONITORING A SPACE BY USING ACOUSTIC WEB

(71) Applicant: Jae Whan Kim, Seoul (KR)

(72) Inventors: Jae Whan Kim, Seoul (KR); Dong Guk Paeng, Jeju-si (KR); Beom Soo Kim, Seoul (KR); Chang Zhu Jin, Jeju-si (KR)

(73) Assignee: Jae Whan Kim, Seoul (KR)

( * ) Notice: Subject to any disclaimer, the term of this patent is extended or adjusted under 35 U.S.C. 154(b) by 0 days.

(21) Appl. No.: 17/349,759

(22) Filed: Jun. 16, 2021

(65) Prior Publication Data

US 2022/0408206 A1 Dec. 22, 2022

(51) Int. Cl.
| | | |
|---|---|---|
| H04R 29/00 | (2006.01) | |
| G10K 15/02 | (2006.01) | |
| H04R 1/08 | (2006.01) | |
| H04R 1/40 | (2006.01) | |
| H04R 3/00 | (2006.01) | |

(52) U.S. Cl.
CPC .......... *H04R 29/002* (2013.01); *G10K 15/02* (2013.01); *H04R 1/08* (2013.01); *H04R 1/403* (2013.01); *H04R 3/00* (2013.01); *H04R 1/406* (2013.01)

(58) Field of Classification Search
CPC ........ H04R 29/002; H04R 1/08; H04R 1/403; H04R 3/00; H04R 1/406; H04R 29/00; H04R 29/004; G10K 15/02
See application file for complete search history.

(56) References Cited

U.S. PATENT DOCUMENTS

| | | | |
|---|---|---|---|
| 9,594,163 | B2 | 3/2017 | Park et al. |
| 10,075,791 | B2 * | 9/2018 | Milne .................. H04B 10/116 |
| 2008/0018461 | A1 | 1/2008 | Reymond |
| 2016/0192098 | A1 * | 6/2016 | Oishi ..................... H04R 27/00 |
| | | | 381/56 |
| 2018/0084363 | A1 * | 3/2018 | Kadri ...................... H04S 7/301 |
| 2021/0314721 | A1 * | 10/2021 | Noh ......................... H04S 7/301 |

FOREIGN PATENT DOCUMENTS

| | | |
|---|---|---|
| KR | 10-2010-0022297 | 3/2010 |
| KR | 10-2014-0124317 | 10/2014 |
| KR | 10-2017-0010170 | 1/2017 |
| KR | 10-2228781 | 3/2021 |

OTHER PUBLICATIONS

International Search Report dated Sep. 29, 2022.

* cited by examiner

*Primary Examiner* — Jason R Kurr

(57) ABSTRACT

The present disclosure relates to an apparatus and method for monitoring a space using a three-dimensional acoustic web, and to a method of emitting a plurality of acoustic signals, forming a three-dimensional acoustic web in a monitoring target space based on interference between acoustic waves, and recognizing a situation of the monitoring target space based on a change in measured acoustic signals.

20 Claims, 13 Drawing Sheets

FIG. 3
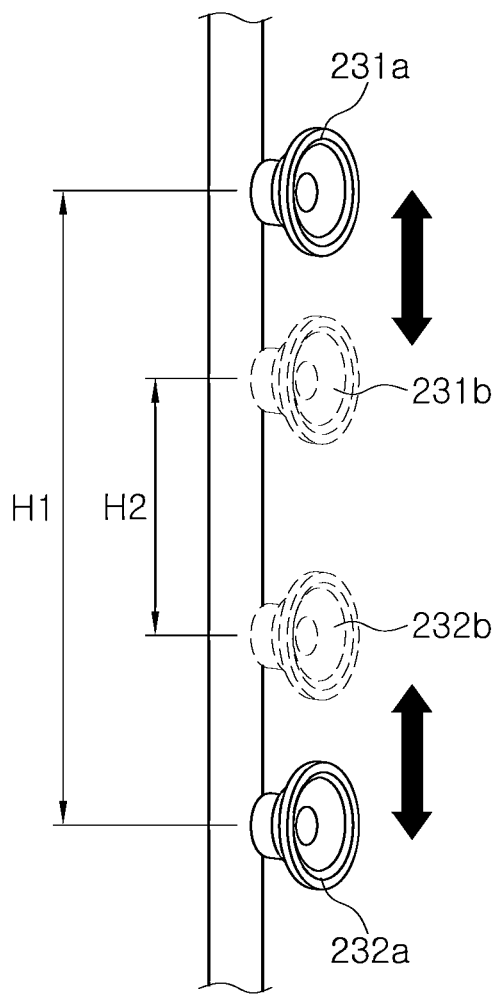 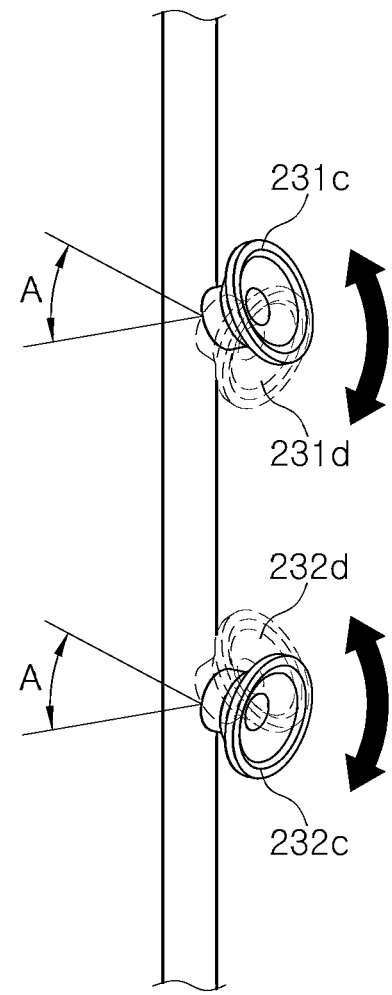
(a)          (b)

FIG. 4
(a)
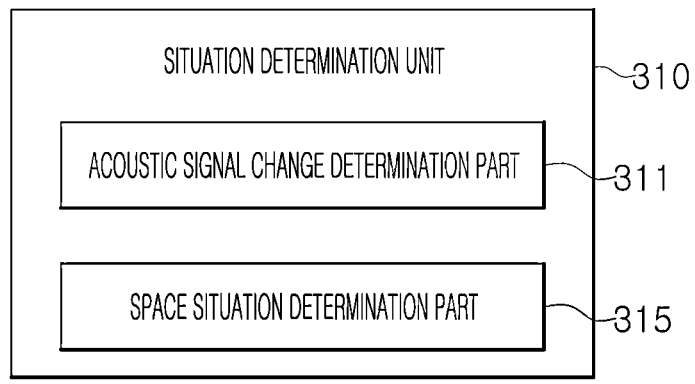
(b)
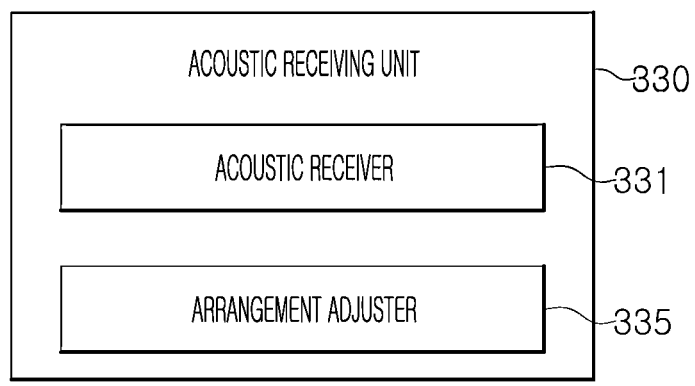

APPARATUS FOR MONITORING A SPACE BY USING ACOUSTIC WEB

BACKGROUND

Field

The present disclosure relates to an apparatus and method for monitoring a space using a three-dimensional acoustic web, and more particularly, to a method of emitting a plurality of acoustic signals, forming a three-dimensional acoustic web in a monitoring target space based on interference between acoustic waves, and recognizing a situation of the monitoring target space based on a change in received acoustic signals.

Description of the Related Art

Various detection sensors and devices are used to detect external intrusion, fire occurrence, and gas leakages in indoor spaces. Recently, with development of IOT technologies, systems have been established to remotely detect various situations such as whether the indoor space is cooled or heated and whether windows are opened or closed and take subsequent actions in response to the detected situations.

In general, CCTVs, IR cameras, vibration detection sensors, gas detection sensors, and the like are applied to various detection technologies. In the related art, because separate sensing devices are required for respective situations such as intrusion, fire occurrence, and gas leakages, a large number of sensing devices are required, to that extent, to monitor various situations of the indoor spaces, which incurs a large amount of cost to establish facilities and results in significantly high power consumption.

To solve the various problems, a technology has been recently proposed, which emits acoustic signals and recognizes a situation of an indoor space based on a change in acoustic signals.

The detection technology using the acoustic signal emits the acoustic signals with a plurality of frequencies into the indoor space, receives the acoustic signals, and measures changes in sound fields (acoustic pressures or phases) for respective frequencies.

In this case, the received sound field for each frequency varies depending on physical properties of the corresponding indoor space. The change in received sound field for each frequency means that the physical properties of the corresponding space have also been changed. Therefore, by analyzing a change pattern of the received sound field for each frequency, it is possible to derive how the physical properties of the corresponding space have been changed.

The detection technology using the acoustic signal in the related art generally emits the acoustic signals with the plurality of frequencies using a single acoustic emitter and then detects a change in sound field for each frequency of the acoustic signal in the space. The configuration, which uses the single acoustic emitter to detect the change in sound field for each frequency, has a low detection ability because the amount of change in sound field caused by the presence or absence of an intruder and a movement of a position of the intruder is relatively small, for example.

A technology using a plurality of acoustic emitters has also been proposed. This technology attempts to remove or reduce interference between acoustic waves on the premise that the interference between the acoustic waves adversely affects the detection of the situation of the space.

DOCUMENTS OF RELATED ART

Patent Documents (Patent Document 0001) Korean Patent No. 10-1725119
(Patent Document 0002) Korean Patent No. 10-1471990

SUMMARY

The present disclosure has been made in an effort to provide a method of emitting acoustic signals in accordance with various situations, recognizing a change in received acoustic signals, and detecting a situation of a monitoring target space to solve a problem that requires separate sensing devices for respective situations of the monitoring target space.

In particular, the present disclosure has been made in an effort to solve a problem of the related art with a low detection ability caused by a configuration in which a single acoustic emitter is used and the amount of change in sound field for each frequency is insufficient.

The present disclosure has also been made in an effort to solve a problem of the related art that uses a plurality of acoustic emitters and attempts to remove and reduce interference between acoustic waves, which cannot increase the amount of change in acoustic signals.

The objects of the present disclosure are not limited to the above-mentioned objects, and other objects and advantages of the present disclosure, which are not mentioned above, may be clearly understood from the following descriptions.

An embodiment of the present disclosure provides an apparatus for monitoring a space using a three-dimensional acoustic web, the apparatus including: an acoustic emitting unit configured to emit a plurality of acoustic signals to a monitoring target space; an acoustic control unit configured to control the emission of the acoustic signals from the acoustic emitting unit to form a three-dimensional acoustic web in the monitoring target space by interference between a plurality of acoustic waves; an acoustic receiving unit configured to receive the acoustic signals in the monitoring target space; and a situation determination unit configured to recognize a situation of the monitoring target space based on the received acoustic signals.

The situation determination unit may measure a frequency response of the monitoring target space using the received acoustic signal, and the situation determination unit may determine a situation of the monitoring target space based on the measured frequency response or determine a change in situation of the monitoring target space based on a change pattern of the measured frequency response.

The acoustic control unit may control the plurality of acoustic signals to emit the acoustic signal made by synthesizing sound with a plurality of frequencies, emit the acoustic signal having a single frequency varying over time, or emit the acoustic signal made by synthesizing sound with a plurality of component frequencies varying over time.

The acoustic control unit may adjust one or more of an emission duration of the acoustic signal, an emission time interval, an emission direction, the number of frequencies emitted simultaneously, a value of frequencies emitted simultaneously, the amount of change in emission frequency over time, a phase of an emission frequency, and a spacing distance between a plurality of acoustic emitters based on a space element in relation to the monitoring target space and a detection element in relation to a detection target.

Another embodiment of the present disclosure provides a method of monitoring a space using a three-dimensional acoustic web, the method including: an acoustic signal emitting step of emitting a plurality of acoustic signals to a monitoring target space; an acoustic web forming step of forming a three-dimensional acoustic web in the monitoring target space by interference between a plurality of acoustic waves; an acoustic signal receiving step of receiving the acoustic signals in the monitoring target space; and a space situation determination step of determining a situation of the monitoring target space based on the received acoustic signals.

The space situation determination step may measure a frequency response of the monitoring target space using the received acoustic signal, and the situation determination unit may determine a situation of the monitoring target space based on the measured frequency response or determine a change in situation of the monitoring target space based on a change pattern of the measured frequency response.

As one example, the acoustic signal emitting step may emit the acoustic signal made by synthesizing sound with a plurality of frequencies, emit the acoustic signal having a single frequency varying over time, or emit the acoustic signal made by synthesizing sound with a plurality of component frequencies varying over time by combining the two methods.

As another example, the acoustic signal emitting step may emit the plurality of acoustic signals to the monitoring target space by adjusting one or more of an emission duration of the acoustic signal, an emission time interval, an emission direction, the number of frequencies emitted simultaneously, a value of frequencies emitted simultaneously, the amount of change in emission frequency over time, a phase of an emission frequency, and a spacing distance between a plurality of acoustic emitters based on a space element in relation to the monitoring target space and a detection element in relation to a detection target.

As described above, according to the present disclosure, the acoustic signals are adjusted and the plurality of acoustic signals are emitted in consideration of the various space elements such as the shape and size of the monitoring target space and the various detection elements such as intruders, fire occurrence, gas leakages, and temperature changes, which makes it possible to form the three-dimensional acoustic web by the interference between the acoustic signals.

Various situations occurring in the monitoring target space may be effectively detected by forming the three-dimensional acoustic web.

In particular, the detection ability may be improved by increasing the amount of change in received acoustic signals by means of the interference between the plurality of acoustic signals, which makes it possible to solve the problem in the related art that the detection performance deteriorates due to insufficient amount of change in acoustic signals when only a single acoustic emitter is used. In addition, it is possible to solve the problem that the sufficient amount of change in acoustic signals cannot be obtained when the plurality of acoustic emitters is used in such a way as to remove or reduce the interference between the acoustic waves.

Further, it is possible to ensure the optimal detection efficiency for the respective situations by adjusting the acoustic signals in consideration of various elements.

The effects obtained by the present disclosure are not limited to the aforementioned effects, and other effects, which are not mentioned above, will be clearly understood by those skilled in the art from the following description.

BRIEF DESCRIPTION OF THE DRAWINGS

The above and other aspects, features and other advantages of the present disclosure will be more clearly understood from the following detailed description taken in conjunction with the accompanying drawings, in which:

FIG. 3 is a view illustrating a configuration in which a plurality of acoustic emitters is disposed and adjusted in the space monitoring apparatus according to the embodiment of the present disclosure;

FIG. 4 is a configuration view illustrating a situation determination means of the space monitoring apparatus according to the embodiment of the present disclosure;

DETAILED DESCRIPTION OF THE EMBODIMENT

Figure 1:
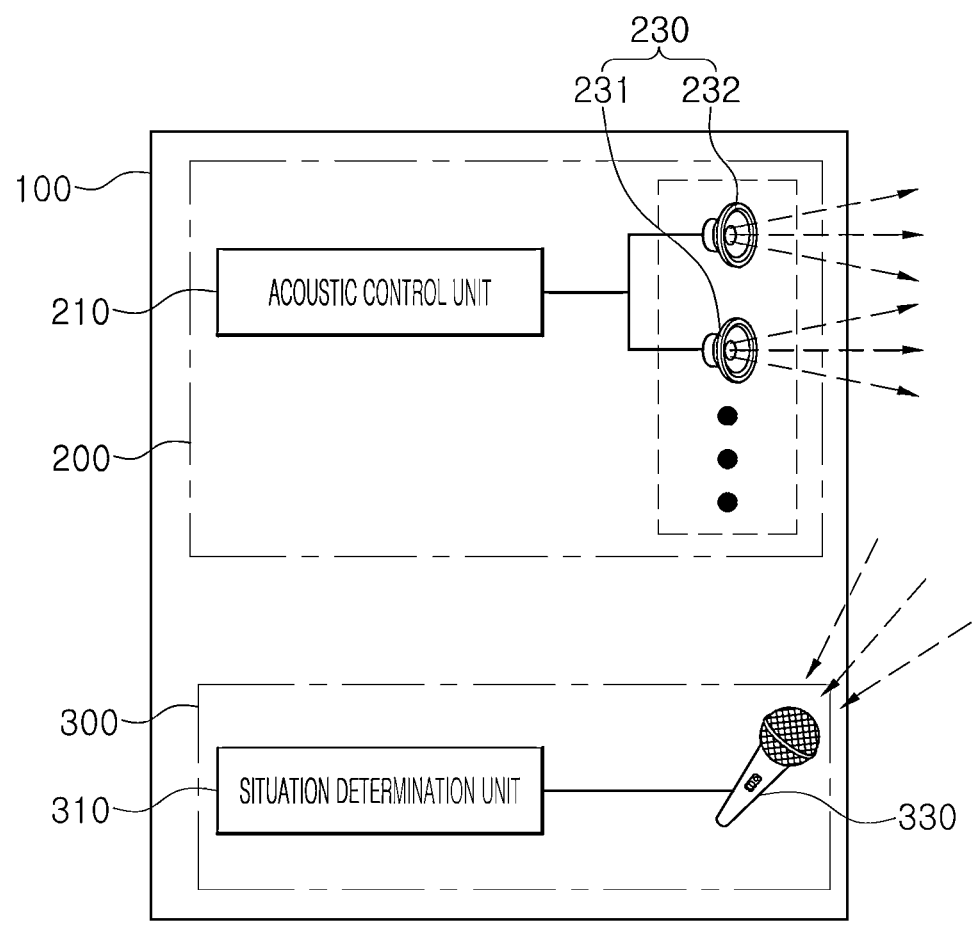
FIG. 1 is a configuration view illustrating a space monitoring apparatus using a three-dimensional acoustic web according to an embodiment of the present disclosure.

Hereinafter, exemplary embodiments of the present disclosure will be described in detail with reference to the accompanying drawings, but the present disclosure is not restricted or limited by the embodiments.

In order to describe the present disclosure, the operational advantages of the present disclosure, and the object achieved by carrying out the present disclosure, exemplary embodiments of the present disclosure will be described.

The terms used herein is used for the purpose of describing particular embodiments only and is not intended to limit the present disclosure. Singular expressions may include plural expressions unless clearly described as different meanings in the context. In the present application, the terms "comprises," "comprising," "includes," "including," "containing," "has," "having" or other variations thereof are inclusive and therefore specify the presence of stated features, integers, steps, operations, elements, components, and/or combinations thereof, but do not preclude the presence or addition of one or more other features, integers, steps, operations, elements, components, and/or combinations thereof.

In the description of the present disclosure, the specific descriptions of publicly known related configurations or functions will be omitted when it is determined that the specific descriptions may obscure the subject matter of the present disclosure.

An acoustic sensor serves to detect physical properties of a space using sound, and representative examples of the acoustic sensor include SONAR (sound navigation and ranging).

The SONAR calculates the azimuth and distance of an object by generating pulsed sound and measuring sound (reflected sound or reflection) or reflected waves returned and reflected by the object. Representative examples of the SONAR include a submarine detector, a fishing detector, and an ultrasonic inspection device for observing shapes of organs such as a fetus or a liver.

There is a sound field sensor (SOFIS) as an acoustic sensor for detecting an object using a principle absolutely different from the principle of the SONAR.

The SOFIS is different from the SONAR in that the SOFIS does not measure dynamic reflected sound (or reflection) but measures a static sound field for each frequency of a standing wave formed in a specific space by emitted acoustic signals with a plurality of synthesized frequencies.

When a motion or temperature of an object is changed in the specific space, the static sound field or the like is changed. The SOFIS may detect a situation of the specific space by measuring and analyzing the changed sound field for each frequency of the standing wave.

The present disclosure may be applied to the case in which reflected waves are used to detect properties of the space like the SONAR. Further, the present disclosure may also be applied to the case in which frequency response of the space are used.

The frequency response of the space may be described as follows. A monitoring target space is considered as a kind of closed circuit, the acoustic signal, as an input signal, is emitted to the monitoring target space, and the acoustic signal, as an output signal, is received. In this case, elements such as an acoustic pressure for each frequency of the received acoustic signal and a phase for each frequency of the received acoustic signal are referred to as 'frequency response of the space'.

As another example, the frequency response of the space may be expressed as a graph including a horizontal axis indicating frequencies of the received acoustic signals, and a vertical axis indicating acoustic pressures of the received acoustic signals. The vertical axis may indicate phase elements instead of the acoustic pressure elements.

Because the frequency response of the space are changed in accordance with the physical properties of the space, a physical situation of the space may be derived from the frequency response of the space. Further, a change in physical properties of the space may be recognized based on a pattern in which the frequency response of the space are changed. In this case, the physical situation of the space may be more precisely detected using the frequency response of the space as a difference between the frequency response of the space according to a difference between the physical properties of the space is increased or as the amount of change in frequency response of the space caused by the change in physical properties of the space is increased.

In the present disclosure, a three-dimensional acoustic web is formed in the corresponding space by the interference between the plurality of acoustic waves by emitting the plurality of acoustic signals into the monitoring target space. Therefore, a difference between the received acoustic signals, which occurs in accordance with the situations of the space, is maximized, and the amount of change in received acoustic signals, which is caused when the situation of the space varies, is maximized. The principle of the present disclosure, which indicates that a change in state of the space may be more precisely detected by maximizing the amount of change in received acoustic signals, may be equally applied to both the case in which the frequency response of the space is used to detect a state of the space and the case in which the reflected waves are used to detect a state of the space.

FIG. 1 is a configuration view illustrating a space monitoring apparatus using a three-dimensional acoustic web according to an embodiment of the present disclosure.

A space monitoring apparatus 100 according to the present disclosure may schematically include an acoustic emitting means 200 and a situation determination means 300.

In this case, the acoustic emitting means 200 and the situation determination means 300 may be included in the single space monitoring apparatus 100. Alternatively, the acoustic emitting means 200 and the situation determination means 300 may be disposed at positions separated and spaced apart from each other and constitute the space monitoring apparatus 100.

Whether the components are integrated or separated may be appropriately selected depending on the applied acoustic signals or selected depending on space elements such as a shape and size of the monitoring target space and detection elements such as intruders, fire occurrence, gas leakages, and temperature changes.

The acoustic emitting means 200 may include an acoustic control unit 210 and an acoustic emitting unit 230.

The acoustic control unit 210 adjusts the acoustic signal to be emitted to the monitoring target space. The acoustic control unit 210 may emit the acoustic signal through the acoustic emitting unit 230 by adjusting emission durations, emission time intervals, emission directions, the number of frequencies to be emitted simultaneously, frequency values, the amount of change in emission frequencies over time, and phases of emission frequencies of acoustic signals emitted to form the three-dimensional acoustic web in the monitoring target space by means of the interference between the plurality of acoustic waves.

For example, the acoustic signals with the plurality of frequencies need to be emitted to measure the frequency response of the monitoring target space. The acoustic control unit 210 may control and emit the acoustic signal made by synthesizing sound with several frequencies or control and emit the acoustic signal such as melody or sine sweep having a single frequency for a particular time. Further, the acoustic control unit 210 may control the frequency so that the emitted frequency is deformed in a rectilinear or stepwise manner over time. In addition, several acoustic syntheses and emission methods may be combined and applied.

The acoustic emitting unit 230 may emit the plurality of acoustic signals to the monitoring target space. To this end, the acoustic emitting unit 230 may include a plurality of acoustic emitters 231 and 232. In this case, the acoustic emitters 231 and 232 may each include a speaker for emitting the acoustic signal.

In addition, arrangement intervals, arrangement angles, and the like of the plurality of acoustic emitters 231 and 232 of the acoustic emitting unit 230 may be adjusted under the control of the acoustic control unit 210 to form the appropriate three-dimensional acoustic web in the monitoring target space.

In particular, the acoustic control unit 210 may control the acoustic emitting unit 230 through machine learning of artificial intelligence. For example, several conditions may be variously changed and adjusted by adjusting the emission duration of the emitted acoustic signal, the emission time interval, the emission direction, the emission frequency value, the amount of change in emission frequencies over time, and the phase of the emission frequency or adjusting the acoustic signals by means of synthesized sound made by adjusting component frequency values of the plurality of frequencies or adjusting the number of component frequencies in consideration of the space elements such as the shape and size of the monitoring target space and the detection elements such as intruders, fire occurrence, gas leakages, and the temperature change.

The situation determination means 300 may include a situation determination unit 310 and an acoustic receiving unit 330.

The acoustic receiving unit 330 may receive the acoustic signal in the monitoring target space. To this end, the acoustic receiving unit 330 may include a microphone that receives the acoustic signal. Further, the acoustic receiving unit 330 may include a plurality of microphones disposed at several positions in the monitoring target space in accordance with the situations.

The situation determination unit 310 may recognize the acoustic signal or the change in acoustic signal with respect to the three-dimensional acoustic web in the monitoring target space based on the acoustic signal received from the acoustic receiving unit 330 and determine the space situation in the monitoring target space based on the acoustic signal or the change pattern of the acoustic signal.

That is, when various changes such as a movement of an object, a temperature change, and a movement of air in the monitoring target space, the acoustic signal is changed due to the changes. The acoustic signal is more greatly changed with the influence of the three-dimensional acoustic web of the monitoring target space. The situation determination unit 310 may recognize the change in acoustic signal and determine the situation in the monitoring target space based on the change pattern of the acoustic signal.

Particularly, the situation determination unit 310 may learn the change pattern of the acoustic signal for various situations occurring in the corresponding monitoring target space through machine learning of artificial intelligence and determine the situation in the monitoring target space based on the change pattern of the acoustic signal.

The configuration of the space monitoring apparatus using the three-dimensional acoustic web according to the embodiment of the present disclosure will be described in more detail.

Figure 2:
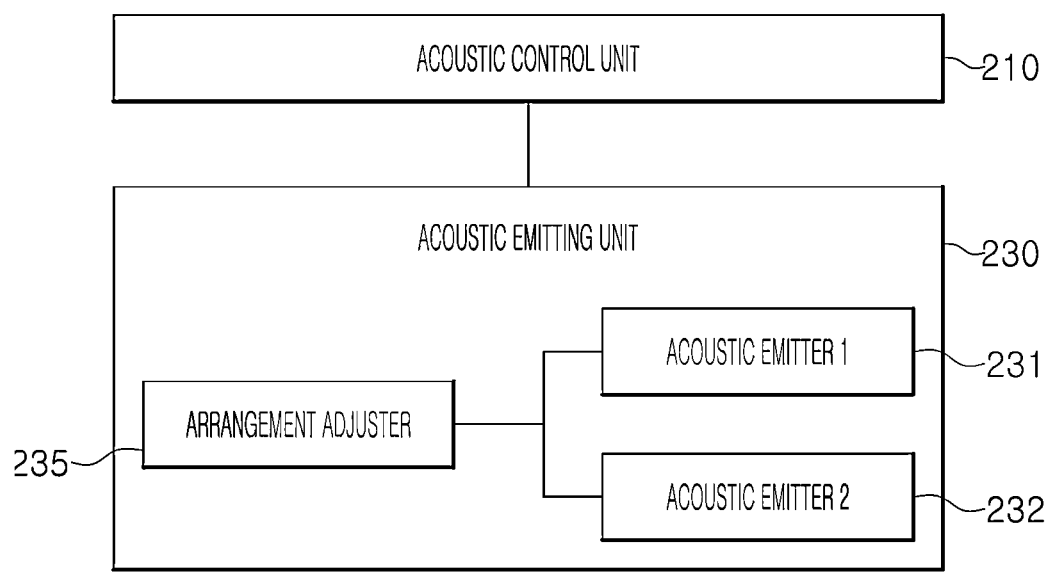
FIG. 2 is a configuration view illustrating an acoustic emitting means of the space monitoring apparatus according to the embodiment of the present disclosure.

FIG. 2 is a configuration view illustrating the acoustic emitting means of the space monitoring apparatus according to the embodiment of the present disclosure.

The acoustic control unit 210 of the acoustic emitting means 200 generates and adjusts the acoustic signal to be emitted. The acoustic control unit 210 may generate the different acoustic signals corresponding to the plurality of acoustic emitters 231 and 232 of the acoustic emitting unit 230 or generate the same acoustic signal. In particular, the acoustic control unit 210 may generate the acoustic signal made by synthesizing the plurality of frequencies or generate the acoustic signal with the frequency that varies over time.

Further, the acoustic control unit 210 may adjust the frequencies, the phases, and the like of the acoustic signal. The acoustic control unit 210 may adjust the component frequency values or the number of component frequencies to emit the plurality of acoustic signals having different frequencies. Alternatively, the acoustic control unit 210 may adjust the frequencies to emit the plurality of acoustic signals with the same frequency set.

In addition, the acoustic control unit 210 may control the acoustic emitting unit 230 to adjust the emission duration of the acoustic signal, the emission time interval, and the spacing distance between the plurality of acoustic emitters.

For example, the acoustic control unit 210 may adjust the frequency of the acoustic signal so that a difference between a maximum value and a minimum value of the acoustic pressures for the respective frequencies, among the frequency responses of the monitoring target space, may have a value equal to or larger than a reference value.

Further, the acoustic control unit 210 may adjust the emission of the acoustic signals from the plurality of acoustic emitters 231 and 232. The acoustic control unit 210 may perform control that the specific acoustic emitter, selected among the plurality of acoustic emitters 231 and 232, outputs the acoustic signal or all the acoustic emitters simultaneously output the acoustic signals.

Particularly, the acoustic control unit 210 may select the appropriate acoustic signal having the single frequency or the synthesized multiple frequencies of the plurality of acoustic signals or selectively adjust the emission time of the acoustic signal, the interval, the change in frequency over time, and the factor such as the phase in consideration of the detection element according to the type of monitoring target such as the movement of the object, the temperature change, and the movement of air and the space element the shape and size of the monitoring target space.

In this case, the acoustic control unit 210 may adjust and provide the acoustic signal based on the result of the artificial intelligence learning on the monitoring element according to the type of monitoring target and the space element according to the monitoring target space.

Further, the acoustic emitting unit 230 of the acoustic emitting means 200 may include the plurality of acoustic emitters 231 and 232 and an arrangement adjuster 235.

Particularly, the acoustic emitting unit 230 may include the even number of acoustic emitters 231 and 232. For example, the acoustic emitting unit 230 may include the two acoustic emitters disposed to be parallel or perpendicular to the ground surface of the monitoring target space. Alternatively, the acoustic emitting unit 230 may include the four acoustic emitters disposed side by side or spaced apart from one another so as to intersect one another in a cross shape.

To this end, the arrangement adjuster 235 may adjust the positions of the plurality of acoustic emitters 231 and 232.

The arrangement adjuster 235 may adjust the interference implemented by the overlap between the acoustic waves by adjusting an acoustic emission angle or adjusting a spacing distance between the plurality of acoustic emitters 231 and 232. For example, the arrangement adjuster 235 may adjust the arrangement positions of the plurality of acoustic emitters 231 and 232 so that the spacing distance is a multiple of a half wavelength of the acoustic signal or a multiple of a wavelength of the acoustic signal. In addition, the arrangement adjuster 235 may adjust the arrangement angles of the plurality of acoustic emitters 231 and 232 so that the plurality of acoustic emitters 231 and 232 is directed in a predetermined angular direction or the same direction.

FIG. 3 is a view illustrating a configuration in which the plurality of acoustic emitters is disposed and adjusted in the space monitoring apparatus according to the embodiment of the present disclosure.

When the acoustic emitting unit includes the two acoustic emitters as illustrated in FIG. 3, the arrangement adjuster 235 may adjust the spacing distance between the acoustic emitters 231*a*, 232*a*, 231*b*, and 232*b* as illustrated in FIG. 3A.

For example, the arrangement adjuster 235 may move the acoustic emitters 231*b* and 232*b* so that a spacing distance H1 between the acoustic emitters 231*a* and 232*a* becomes a spacing distance H2. To this end, the arrangement adjuster 235 may include a guide rail (not illustrated) and a drive means (not illustrated) for moving the acoustic emitter.

In addition, as illustrated in FIG. 3B, the arrangement adjuster 245 may adjust the acoustic emission angles of the acoustic emitters 231*c*, 232*c*, 231*d*, and 232*d*. For example, the arrangement adjuster 235 may adjust the angles so that the acoustic emitters are directed in the same direction or in the different directions. To this end, the arrangement adjuster 235 may include a configuration (not illustrated) of a tilting function for adjusting the acoustic emission angle of the acoustic emitter.

FIG. 4 is a configuration view illustrating the situation determination means of the space monitoring apparatus according to the embodiment of the present disclosure.

The situation determination unit 310 may include an acoustic signal change determination part 311 and a space situation determination part 315.

The acoustic signal change determination part 311 may recognize the change in acoustic signals by comparing the acoustic signals received at different times by the acoustic receiving unit 330 or comparing the received acoustic signal with a reference acoustic signal. Alternatively, the acoustic signal change determination part 311 may measure the frequency response of the space based on the received acoustic signals and recognize the change in acoustic signals by comparing the frequency response of the space measured at different times or comparing the measured frequency response of the space with reference frequency response. The Fourier transform algorithm or the fast Fourier transform algorithm may be used to measure the frequency response of the space based on the received acoustic signal.

The space situation determination part 315 may determine the situation of the monitoring target space based on the received acoustic signal. Particularly, the space situation determination part 315 may analyze the frequency response of the space or the change pattern of the frequency response of the space and determine the situation of the monitoring target space based on the analysis result.

In this case, the space situation determination part 315 may determine the situation of the monitoring target space in relation to the frequency response of the space or the change pattern of the frequency response of the space based on the result of the artificial intelligence learning. To this end, the machine learning of artificial intelligence is performed in advance based on the learning data in relation to the frequency response of the space or the space situations for the respective change patterns of the frequency response of the space. The space situation determination part 315 may determine the situation of the corresponding monitoring target space in relation to the frequency response of the space or the change pattern of the frequency response of the space based on the result of the artificial intelligence learning. Further, the optimized determination of the situation in the corresponding monitoring target space may be performed by consistently and additionally acquiring data in relation to the frequency response of the space or the change pattern of the frequency response of the space for the respective situations in the specific monitoring target space and learning the data.

The acoustic receiving unit 330 may include an acoustic receiver 331 and an arrangement adjuster 335.

The acoustic receiver 331 may be disposed in the monitoring target space and may include a single microphone or a plurality of microphones spaced apart from one another so as to correspond to the acoustic emitting unit 230.

The arrangement adjuster 335 may adjust an arrangement position and an arrangement angle to position the acoustic receiver 331 at an optimal position corresponding to the acoustic emitting unit 230. In the case in which the acoustic receiver 331 includes the plurality of microphones, the arrangement adjuster 335 may adjust spacing distances between the plurality of microphones or adjust directions in which the plurality of microphones is directed.

An operational principle of the space monitoring apparatus according to the present disclosure will be described with reference to FIGS. 5 and 6.

Figure 5:
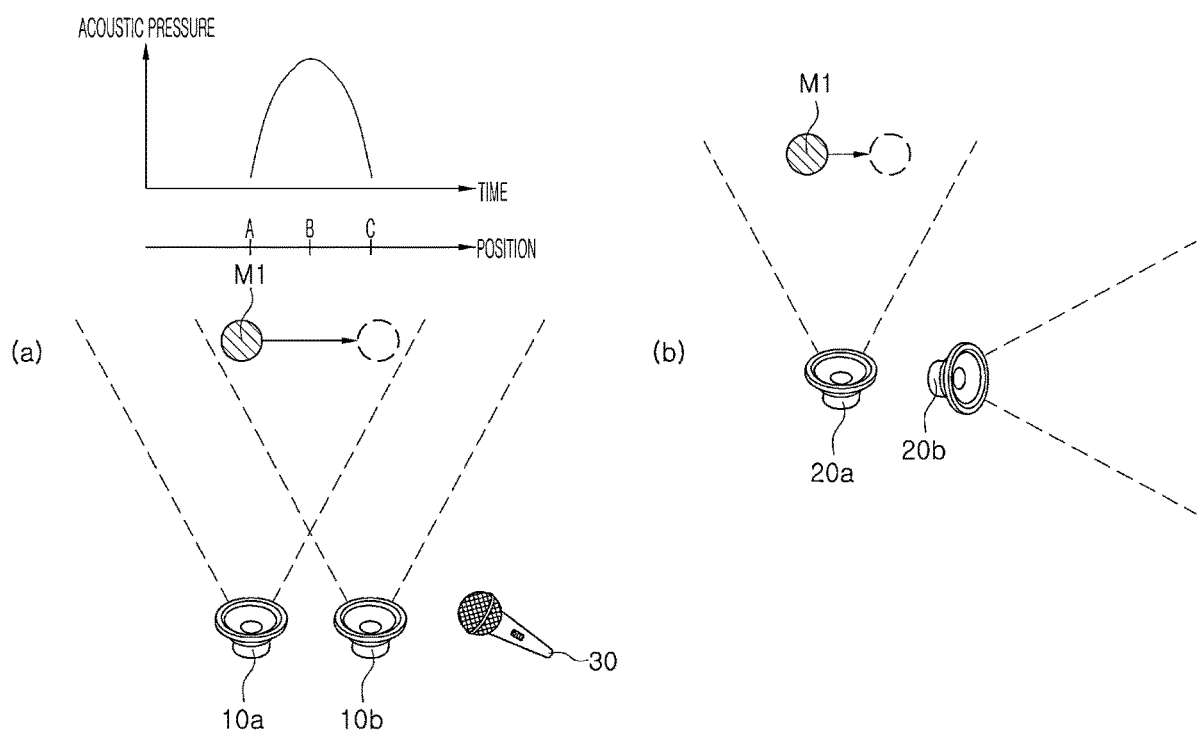
FIG. 5 is a view illustrating a concept of object detection improved by interference between acoustic waves in accordance with the present disclosure.

FIG. 5 is a view illustrating a concept of object detection improved by interference between acoustic waves in accordance with the present disclosure.

A change in relative position of an object in a specific space may be detected by outputting an acoustic signal to the specific space by the single acoustic emitter and measuring a change in received acoustic signal. Alternatively, a change in relative position of an object in a specific space may be detected by outputting acoustic signals with a plurality of frequencies by the acoustic emitters, measuring frequency response of the space, and then using a change in frequency response.

The change in relative position of the object may be more precisely detected when the acoustic signals emitted from the two acoustic emitters are used than when the acoustic signal emitted from the single acoustic emitter is used.

FIG. 5A is a view illustrating a situation in which the space monitoring apparatus including two acoustic emitters 10*a* and 10*b* configured to emit the acoustic signals to the specific space, and a single acoustic receiver 30. In this case, the acoustic emitters 10*a* and 10*b* may each include a speaker, and the acoustic receiver 30 may include a microphone.

The acoustic signals outputted from the acoustic emitters 10*a* and 10*b* interfere with each other. On the assumption that destructive interference occurs between acoustic signals at a position A and a position C and constructive interference occurs between acoustic signals at a position B, the amount of change in acoustic signals, which is measured by the acoustic receiver 30, may be maximized by the destructive interference implemented by the overlap between the acoustic waves and by the constructive interference between the acoustic waves when an object M1 moves from the position A to the position C via the position B in the specific space.

In the case in which the single acoustic emitter is provided, the amount of change in acoustic signal, which is measured by the acoustic receiver, may be insignificant because the object M1 is detected based on only the single acoustic signal emitted from the single acoustic emitter. As the emission output of the acoustic signal increases, an absolute magnitude of the acoustic signal may increase, but a change rate of the acoustic signal received by the movement of the object does not increase. That is, a signal-to-noise ratio does not increase even though the absolute magnitude of the signal increases.

When the two or more acoustic emitters are used as described above, the constructive interference and the destructive interference occur between the acoustic signals emitted from the plurality of acoustic emitters. Therefore, the change pattern of the acoustic signal measured by the acoustic receiver 30, when the object M1 moves in the specific space, has a remarkable aspect, which makes it possible to precisely measure the change in relative position of the object M1.

In particular, in a case in which the acoustic signals emitted from the two acoustic emitters have multiple frequency components, the change pattern of the acoustic signal may have the more remarkable change aspect, which makes it possible to more precisely measure the change in relative position of the object M1.

As described above, the mutual interference and the constructive interference between the signals, which act as noise in a typical signal processing field, act as important elements capable of improving the performance in detecting various space situations such as intrusion, fires, and gas leakages in the present disclosure.

Meanwhile, as an extreme example, the mutual interference between the acoustic signals emitted from the two acoustic emitters may occur well when the acoustic emitters 10a and 10b are disposed to emit the acoustic signals in the same direction as illustrated in FIG. 5A.

In a case in which two acoustic emitters 20a and 20b are disposed in a direction in which mutual interference between acoustic signals emitted from the two acoustic emitters 20a and 20b is reduced or does not occur as illustrated in FIG. 5B, the mutual interference and the constructive interference between the acoustic signals do not occur or do not appropriately occur. For this reason, the amount of change in acoustic signals is insignificant, and an effective detection performance cannot be implemented.

Further, it is possible to improve the performance in detecting various situations by further maximizing the amount of change in acoustic signals by appropriately adjusting the number of acoustic emitters.

For example, in the case in which the four acoustic emitters are arranged in a cross shape, it is possible to more precisely observe the change pattern of the acoustic signal based on the mutual interference and the constructive interference alternately occurring between the acoustic signals emitted from the four acoustic emitters regardless of a movement direction of an intruder.

Figure 6:
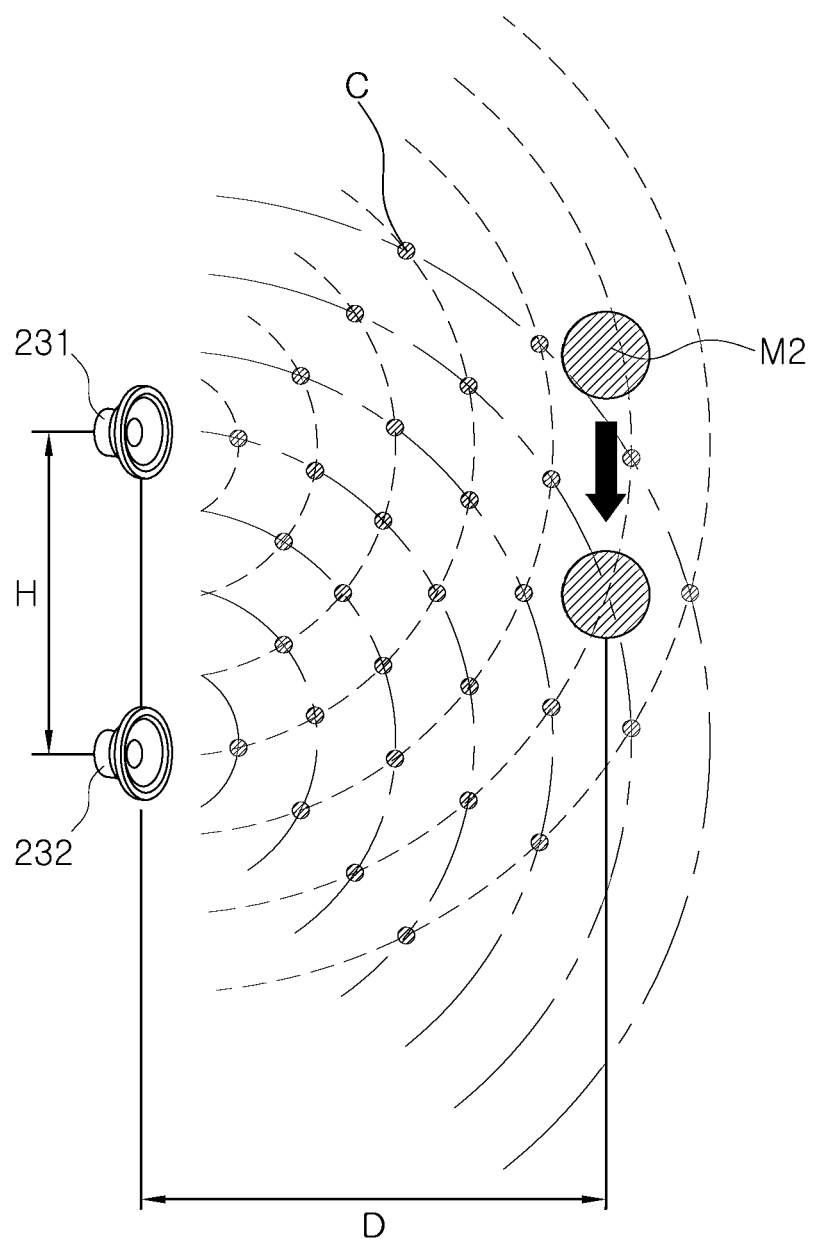
FIG. 6 is a view illustrating a configuration that forms a three-dimensional acoustic web using the interference between the acoustic waves in a monitoring target space according to the embodiment of the present disclosure.

FIG. 6 is a view illustrating a configuration that forms a three-dimensional acoustic web using the interference between the acoustic waves in the monitoring target space according to the embodiment of the present disclosure.

In the present disclosure, the spacing distance between the plurality of acoustic emitters is adjusted, the acoustic signals are emitted, and thus the three-dimensional acoustic web is formed by the interference implemented by the overlap between the acoustic signals.

When the two acoustic emitters 231 and 232 are disposed with the spacing distance H, which is a multiple of the wavelength of the acoustic signal, and the acoustic signals are emitted as illustrated in FIG. 6, the destructive interference or the constructive interference occurs at points C of overlap between the acoustic signals emitted from the two acoustic emitters 231 and 232. The acoustic web may be formed by the interference for each point of overlap between the acoustic signals.

FIG. 6 illustrates the acoustic web in the form of a flat plane. However, because the acoustic signals emitted from the acoustic emitters 231 and 232 substantially propagate in the three-dimensional space, the points of overlap between the acoustic signals are arranged in the three-dimensional space, such that the three-dimensional acoustic web may be formed in the monitoring target space.

When an object M2 moving in a portion at a distance D from the acoustic emitters 231 and 232 passes through the three-dimensional acoustic web, the received acoustic signal is greatly changed. It is possible to determine the space situation by recognizing the change in acoustic signal.

A condition for improving the efficiency in detecting the space situation using the interference between the acoustic signals according to the embodiment of the present disclosure will be described.

Figure 7:
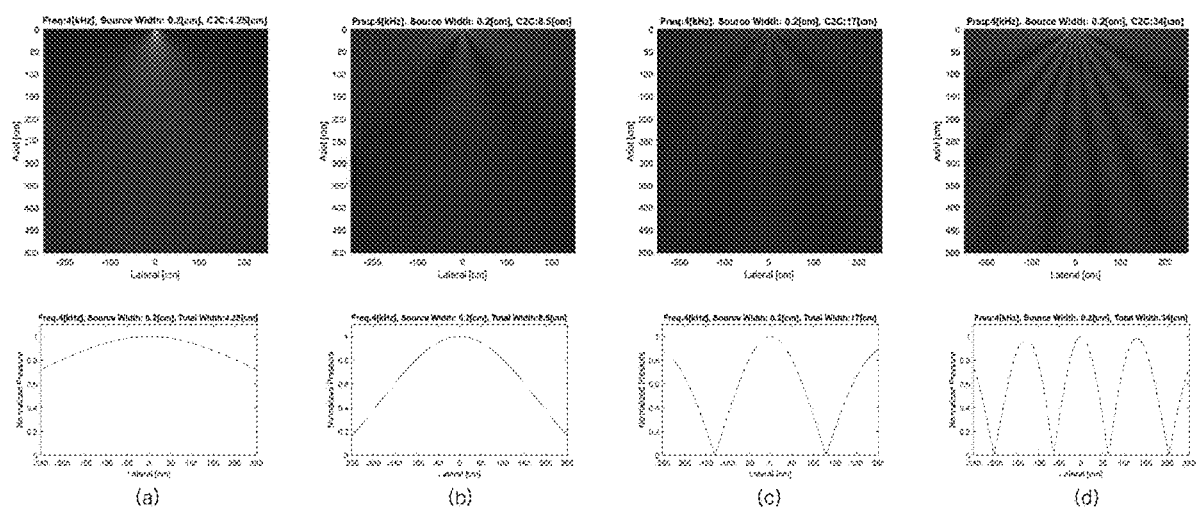
FIG. 7 is a view illustrating a result of a simulation related to a change in acoustic signals in accordance with an adjustment of a spacing distance between the two acoustic emitters according to the present disclosure.

FIG. 7 is a view illustrating a result of a simulation related to a change in acoustic signals in accordance with an adjustment of a spacing distance between the two acoustic emitters according to the present disclosure.

A simulation was performed on a change in acoustic signals by emitting the acoustic signals with a frequency of 4 kHz and a wavelength of 8.5 cm from the two acoustic emitters while moving an object within a range of 2.5 m in left and right directions at a distance of 5 m from the acoustic emitters.

FIGS. 7A to 7D are photographs illustrating interference between acoustic signals and graphs illustrating changes in acoustic pressures with respect to changes in positions of an object when the spacing distance between the two acoustic emitters is adjusted to values of 0.5, 1, 2, and 4 times the wavelength.

Referring to FIGS. 7A to 7D, it can be seen that the amount of change in acoustic pressures further increases as the spacing distance increases to the multiples of the wavelength.

Referring to FIG. 7C, it can be seen that an interval between peaks of the acoustic signal for the respective positions is approximately 2.6 m. Referring to FIG. 7D, it can be seen that an interval between peaks of the acoustic signals is approximately 1.3 m. It is assumed that a person moves 1.3 m in the situation illustrated in FIG. 7. In the case illustrated in FIG. 7A, even though the person moves 1.3 m, the amount of change in acoustic signals is not large between before and after the person's movement. Even in the case illustrated in FIG. 7B, the amount of change in acoustic signals is not large between before and after the person's movement. However, it can be seen that in the case illustrated in FIG. 7C, a difference between the acoustic signals between before and after the person moves 1.3 m. Meanwhile, it can be seen that in the case illustrated in FIG. 7D, a difference between the acoustic signals is not large when the person moves 1.3 m. Accordingly, if it is important to detect a situation in which a person moves 1 m from a position at a distance of 5 m in a security space, for example, in the situation illustrated in FIG. 7, the spacing distance between the acoustic emitters may be set to a value of twice the wavelength.

If the spacing distance between the acoustic emitters increases to the values of ten or twenty times the wavelength as illustrated in FIG. 7, the interval between the peaks of the acoustic signals decreases by several tens of centimeters. In this case, among the acoustic signals reflected by respective portions of a body of a person who is stationary in the monitoring target space, the constructive interference occurs between the acoustic signals by one portion of the person's body, and the destructive interference occurs between the acoustic signals by another portion of the person's body. The acoustic signal, which is reflected by the stationary person and then received, is a sum of signals reflected by the respective portions of the person's body. As a result, the acoustic signal becomes a signal close to an average value. Accordingly, there is almost no difference between the acoustic signals even though the person moves in the security space. In contrast, the interval between the peaks of the acoustic signals may be set to a value of several tens of centimeters to efficiently detect a movement of a small animal such as a hamster.

The interval of the constructive interference of the three-dimensional acoustic web or the interval of the destructive interference of the three-dimensional acoustic web, i.e., the interval of the mesh may typically and appropriately be several times the size of an object to be monitored. Therefore, the appropriate spacing distance between the acoustic emitters may vary depending on how to set a monitoring target in the monitoring target space and on the value of the frequency being used. To monitor a motion of a person in the situation illustrated in FIG. 7, the spacing distance between the acoustic emitters may appropriately be twice the wavelength. To monitor a motion of a cat, the spacing distance between the acoustic emitters may appropriately be four times the wavelength.

That is, the spacing distance between the acoustic emitters may be appropriately adjusted in consideration of the space elements in relation to the monitoring target space and the detection elements in relation to the detection target.

According to the experimental results, it can be seen that the change in acoustic signals is more apparent when the interference between the acoustic signals through the plurality of acoustic emitters is used than when the single acoustic emitter is applied.

Figure 8:
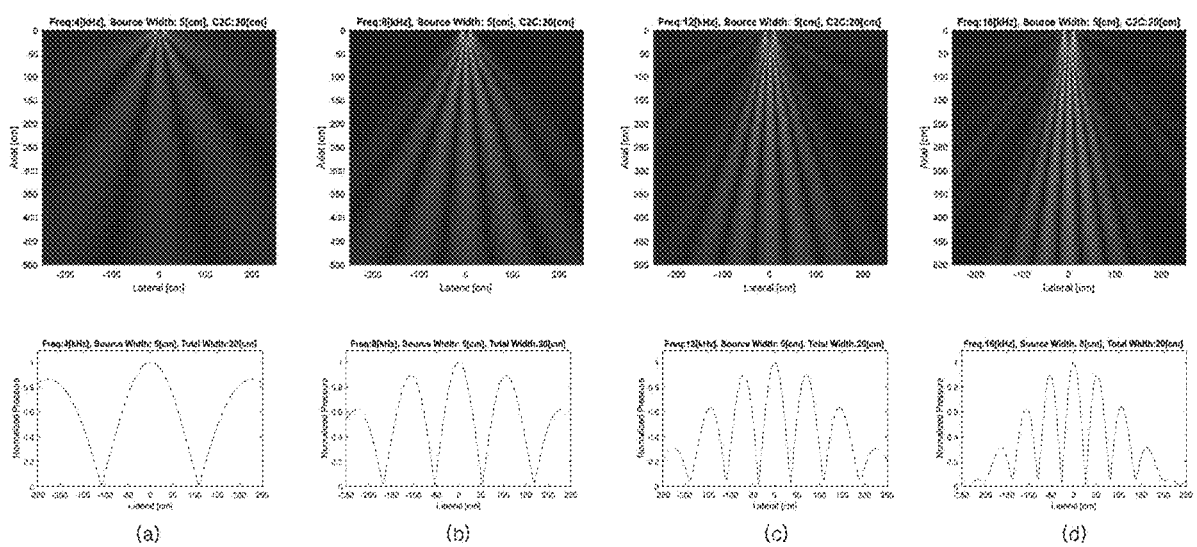
FIG. 8 is a view illustrating a result of a simulation related to a change in acoustic signals in accordance with an adjustment of wavelengths of acoustic signals emitted from the two acoustic emitters according to the present disclosure.

FIG. 8 is a view illustrating a result of a simulation related to a change in acoustic signals in accordance with an adjustment of wavelengths of acoustic signals emitted from the two acoustic emitters according to the present disclosure.

The acoustic pressures were measured by emitting the acoustic signals with the changed frequencies and moving an object within a range of 2.5 m in the left and right directions at a distance of 5 m in a state in which the spacing distance between the two acoustic emitters is fixed to 20 cm.

FIGS. 8A to 8D are photographs illustrating interference between acoustic signals and graphs illustrating changes in acoustic pressures with respect to changes in positions of an object when the frequency of the acoustic signal is adjusted to values of 4 kHz, 8 kHz, 12 kHz, and 16 kHz. In FIGS. 8A to 8D, a ratio of the spacing distance between the acoustic emitters to the frequency is about 2.5, 4.5, 7, and 9.5.

Figure 9:
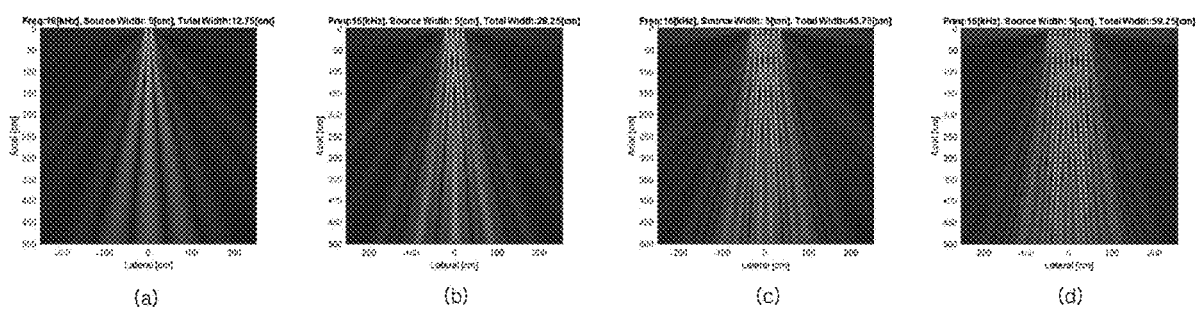
FIG. 9 is a view illustrating a result of a simulation related to a change in acoustic signals in accordance with the number of acoustic emitters according to the present disclosure.

FIG. 9 is a view illustrating a result of a simulation related to a change in acoustic signals in accordance with the number of acoustic emitters according to the present disclosure.

The interference between the acoustic signals was recognized by changing the number of acoustic emitters in a state in which the spacing distance between the plurality of acoustic emitters, which emits the acoustic signal with 16 kHz, is fixed to a value of six times the wavelength of the acoustic signal.

FIGS. 9A to 9D are photographs illustrating interference between the acoustic signals when the number of acoustic emitters is 2, 4, 6, and 8.

According to the result of the experiment performed by changing the number of acoustic emitters, it can be seen that the resolution related to the fine change in the monitoring target space is improved as the number of acoustic emitters increases. Further, it can be seen that the two to four acoustic emitters may sufficiently perform the detection at the time of recognizing the change in the monitoring target space at a predetermined level or higher, for example, recognizing a motion of an intruder or the like.

That is, even a motion of a small object may be detected when the resolution related to the fine change in position in the space is improved. However, a large number of acoustic emitters is not suitable to detect a motion of a large object. Accordingly, the number of acoustic emitters may be appropriately adjusted in consideration of the space elements in relation to the monitoring target space and the detection elements in relation to the detection target.

The wavelength of the acoustic signal, the spacing distance between the plurality of acoustic emitters, and the number of acoustic emitters may be adjusted in accordance with the result of the simulation in consideration of the space elements such as the shape and size of the monitoring target space and the detection elements in relation to detection targets such as intruders, fire occurrence, gas leakages, and temperature changes.

Further, the present disclosure provides a space monitoring method using the space monitoring apparatus using the three-dimensional acoustic web according to the present disclosure. Hereinafter, the space monitoring method using the three-dimensional acoustic web according to the present disclosure will be described with reference to the embodiment of the space monitoring apparatus according to the present disclosure.

Figure 10:
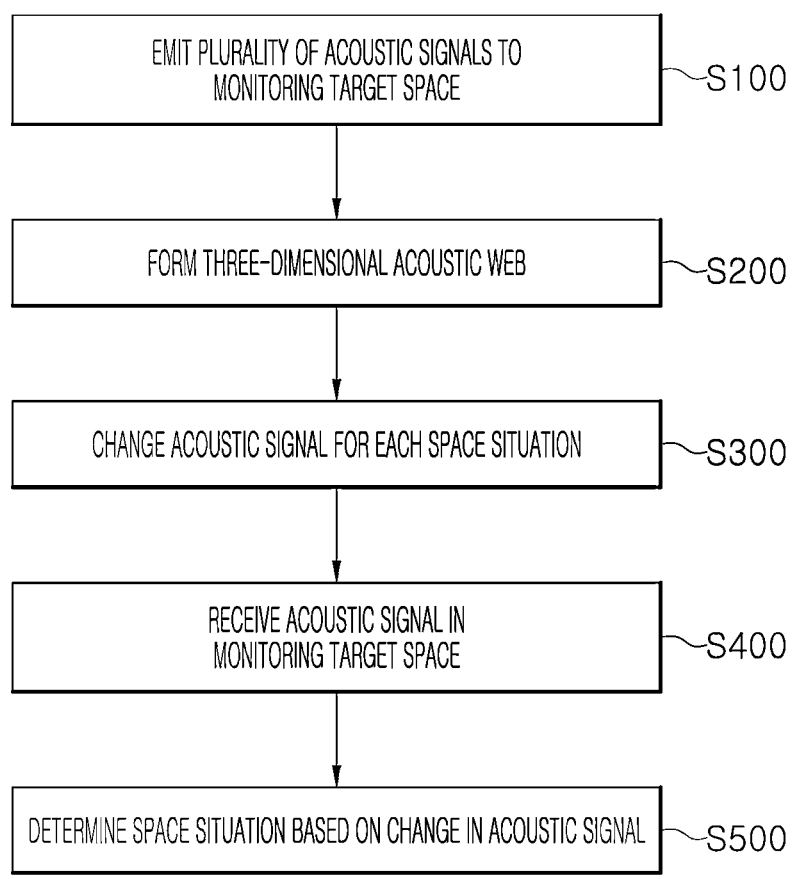
FIG. 10 is a flowchart of a space monitoring method using a three-dimensional acoustic web according to the embodiment of the present disclosure.

FIG. 10 is a flowchart of the space monitoring method using the three-dimensional acoustic web according to the embodiment of the present disclosure.

The acoustic emitting means 200 emits the plurality of acoustic signals to the monitoring target space by using the plurality of acoustic emitters 231 and 232 to monitor the monitoring target space (S100).

In this case, the acoustic emitting means 200 emits the acoustic signals by adjusting the wavelength of the acoustic signal, the spacing distance between the plurality of acoustic emitters, and the number of acoustic emitters in consideration of the space elements such as the shape and size of the monitoring target space and the detection elements in relation to detection targets such as intruders, fire occurrence, gas leakages, and temperature changes.

Figure 11:
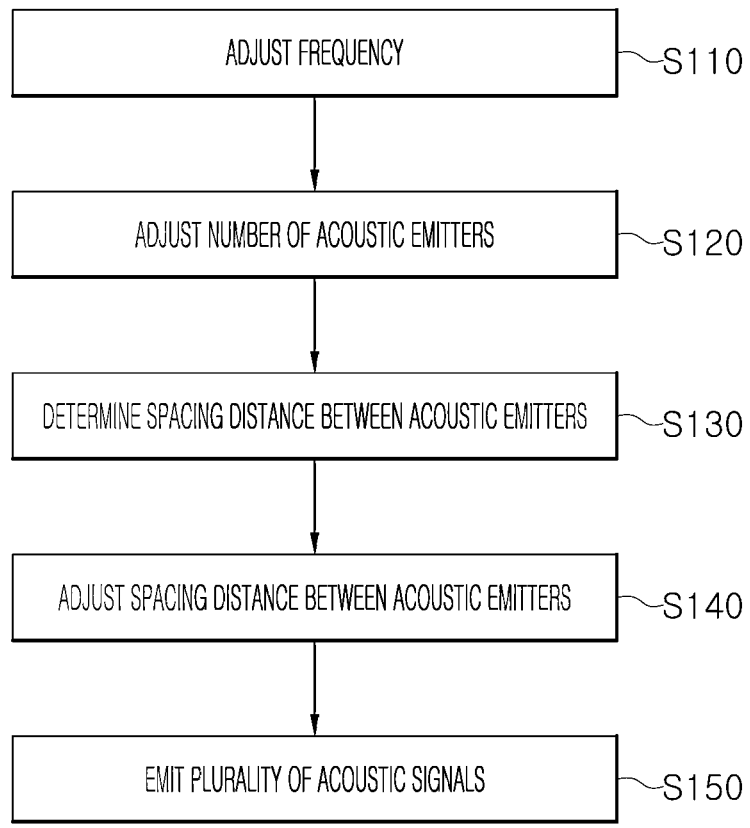
FIG. 11 is a flowchart illustrating a process of adjusting emission of acoustic signals in accordance with the space monitoring method according to the embodiment of the present disclosure.

The embodiment of the process of adjusting the emission of the acoustic signals will be described with reference to FIG. 11.

The acoustic control unit 210 adjusts the acoustic signal based on the result of the artificial intelligence learning in consideration of the space elements in relation to the monitoring target space and the detection elements in relation to the detection target.

First, in consideration of the space elements and the detection elements, the acoustic control unit 210 selects the frequency of the acoustic signal to be emitted (S110) and selects the number of acoustic emitters for emitting the acoustic signals (S120).

Further, in consideration of various elements such as the space elements, the detection elements, the frequencies of the acoustic signals, and the number of acoustic emitters, the acoustic control unit 210 determines the spacing distance between the acoustic emitters (S130) and adjusts the spacing distance between the acoustic emitters (S140). In addition, in consideration of the space elements, the detection elements, the frequencies of the acoustic signals, and the number of acoustic emitters, the acoustic control unit 210 may determine the emission angle of the acoustic signal from the acoustic emitter and adjust the angle of the acoustic emitter.

Particularly, an acoustic signal condition for improving optimal detection performance for various situations may be set based on the machine learning of the artificial intelligence.

The frequencies of the acoustic signals, the number of acoustic emitters, the spacing distance between the acoustic emitters, and the like may be adjusted based on the acoustic signal condition.

Further, in consideration of the space elements and the detection elements, the acoustic control unit 210 may adjust the emission duration of the acoustic signals, the emission time intervals, the emission frequency values, the amount of change in emission frequencies over time, and the phases of the emission frequencies and adjust the acoustic signals with synthesized sound made by adjusting the values of the plurality of component frequencies or the number of component frequencies. In addition, the acoustic control unit 210 may adjust the plurality of acoustic signals so that the acoustic signal with the single frequency is changed in frequency over time or the plurality of synthesized frequencies is changed over time.

When the respective conditions are set for the acoustic signals, the acoustic control unit 210 controls the acoustic emitting unit 230 and emits the plurality of acoustic signals to the monitoring target space (S150).

The subsequent processes will be described with reference back to FIG. 10.

As the plurality of acoustic signals is emitted, the three-dimensional acoustic web is formed by the interference between the plurality of acoustic signals in the monitoring target space (S200).

When various changes in situations, such as motions of intruders, fire occurrence, gas leakages, and temperature changes, occur in the state in which the three-dimensional acoustic web is formed in the monitoring target space, the acoustic signals are changed for the respective space situations by being affected by the three-dimensional acoustic web (S300).

The situation determination means 300 receives the acoustic signals in the monitoring target space (S400), recognizes the change in received acoustic signals, and determines the space situation (S500).

Particularly, the situation determination means 300 may learn the change pattern of the frequency response of the space for various situations in the monitoring target space based on the result of the artificial intelligence learning and determine which situation occurs in the monitoring target space by analyzing the measured change pattern of the frequency response of the space.

Figure 12:
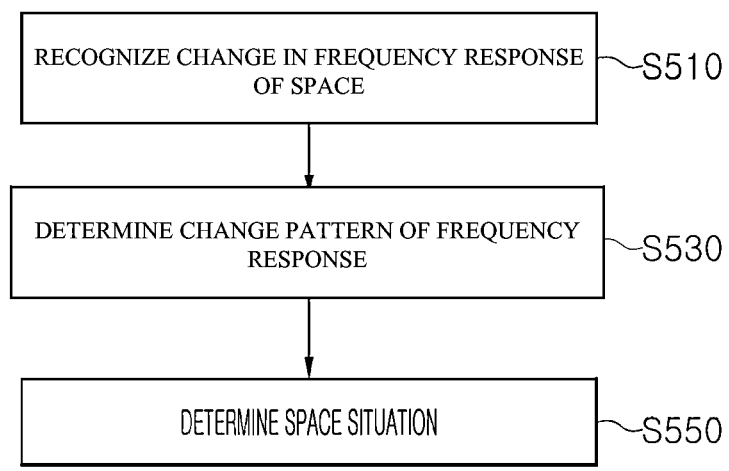
FIG. 12 is a flowchart illustrating a process of determining a space situation in accordance with the space monitoring method according to the embodiment of the present disclosure.

An embodiment of a process of determining a space situation will be described with reference to FIG. 12.

When the frequency response of the monitoring target space are measured based on the acoustic signals in the monitoring target space received by the acoustic receiver 331, the acoustic signal change determination part 311 recognizes the change in frequency response by comparing the frequency response of the space, which are measured at different times, or comparing the measured frequency response of the space with the reference frequency response (S510).

Further, the space situation determination part 315 determines the change pattern of the frequency response of the space (S530) and determines the situation of the monitoring target space based on the change pattern of the frequency response of the space (S550).

Particularly, the space situation determination part 315 may recognize the situation in the monitoring target space based on the result of the artificial intelligence learning in relation to the change pattern of the frequency response of the space for the respective situations of the corresponding monitoring target space.

An embodiment of a process of determining a situation in the monitoring target space using the three-dimensional acoustic web will be described with reference to FIGS. 13 and 14.

Figure 13:
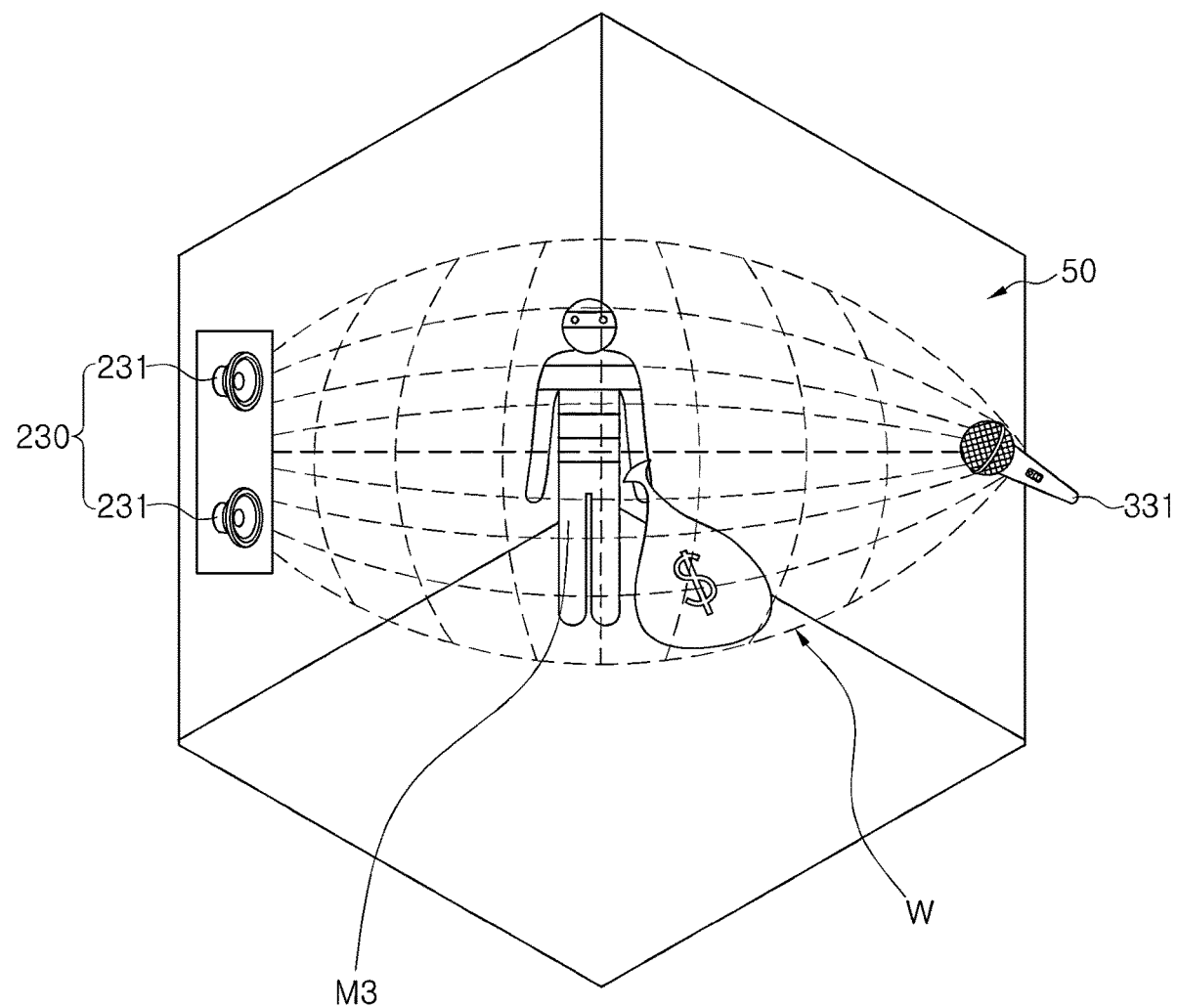
FIG. 13 is a view illustrating a process of detecting an intruder in the monitoring target space according to the embodiment of the present disclosure.

FIG. 13 is a view illustrating a process of detecting an intruder in the monitoring target space according to the embodiment of the present disclosure.

The plurality of acoustic emitters 231 and 232 of the acoustic emitting unit 230 emits the plurality of acoustic signals to the monitoring target space 50, such that a three-dimensional acoustic web W is formed.

When an intruder M3 enters the monitoring target space 50 and moves in the monitoring target space 50 in the state in which the three-dimensional acoustic web W is formed in the monitoring target space 50, the acoustic signals are more greatly changed in comparison with the case in which there is no acoustic web.

The acoustic receiver 331 of the acoustic receiving unit 330 may receive the acoustic signals in the monitoring target space 50, and the situation in which the intruder M3 enters the monitoring target space 50 may be detected based on the recognized change pattern of the frequency response of the space.

Figure 14:
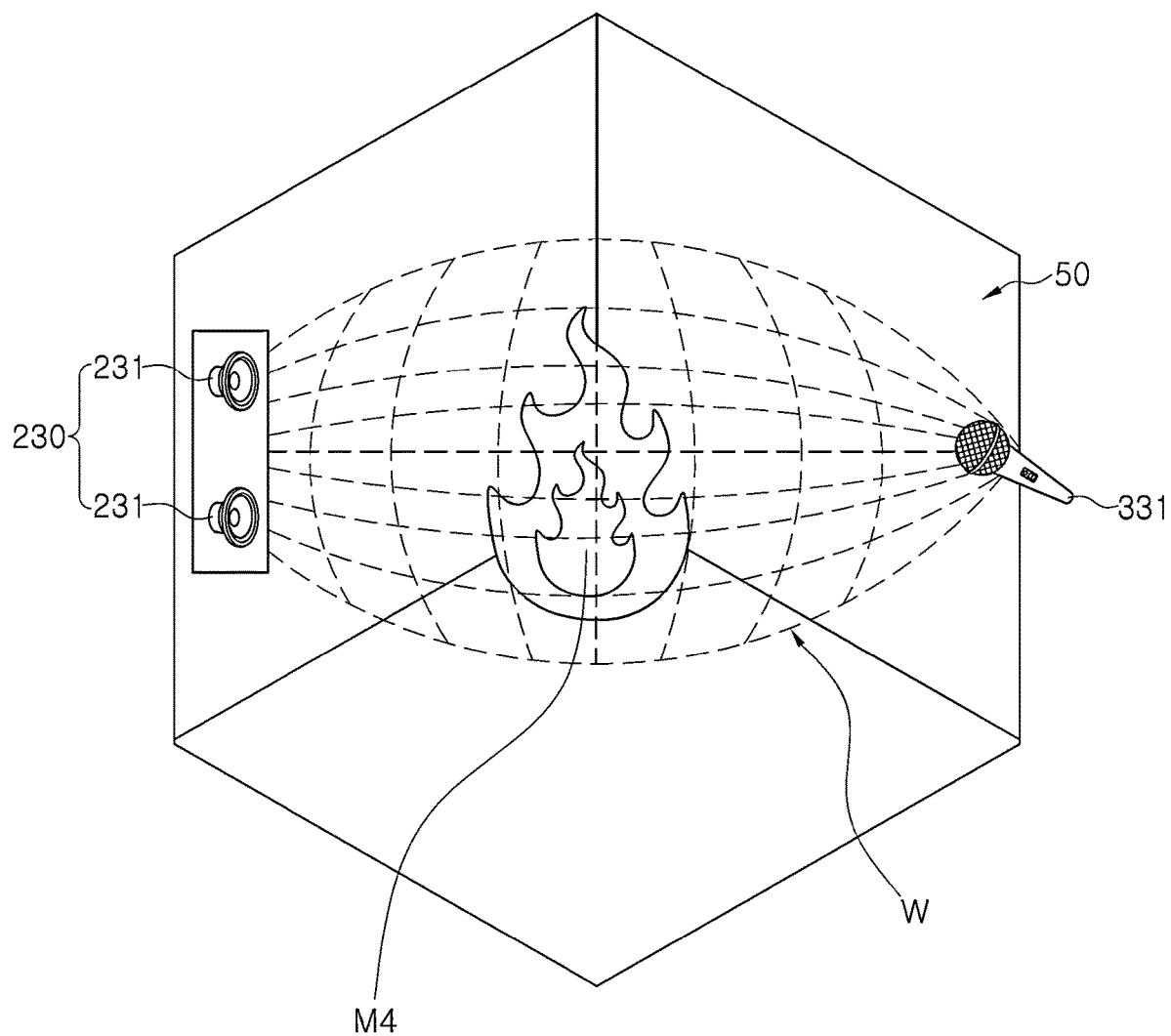
FIG. 14 is a view illustrating a process of detecting occurrence of fire in the monitoring target space according to the embodiment of the present disclosure.

FIG. 14 is a view illustrating a process of detecting the occurrence of fire in the monitoring target space according to the embodiment of the present disclosure.

Like the case illustrated in FIG. 13, when a fire M4 occurs in the monitoring target space 50 in the state in which the three-dimensional acoustic web W is formed in the monitoring target space 50, a temperature and an air flow in the monitoring target space 50 are changed due to the fire M4. For this reason, the acoustic signals are greatly changed by being affected by the three-dimensional acoustic web W.

The acoustic receiver 331 of the acoustic receiving unit 330 may receive the acoustic signals in the monitoring target space 50, and the situation in which the fire M4 occurs in the monitoring target space 50 may be detected based on the recognized change pattern of the frequency response of the space.

As described above, according to the present disclosure, the acoustic signals are adjusted and the plurality of acoustic signals are emitted in consideration of the various space elements such as the shape and size of the monitoring target space and the various detection elements such as intruders, fire occurrence, gas leakages, and temperature changes, which makes it possible to form the three-dimensional acoustic web by the interference between the acoustic signals.

Various situations occurring in the monitoring target space may be effectively detected by forming the three-dimensional acoustic web.

In particular, the detection ability may be improved by the acoustic waves enhanced by the interference between the plurality of acoustic signals, which makes it possible to solve the problem in the related art that the detection performance deteriorates due to insufficient change in acoustic signals when only a single acoustic emitter is used. In addition, it is possible to solve the problem that the change in acoustic signals is insufficient when the plurality of acoustic emitters is used in such a way as to remove or reduce the interference between the acoustic waves.

Further, it is possible to ensure the optimal detection efficiency for the respective situations by adjusting the acoustic signals in consideration of various elements.

The above description is simply given for illustratively describing the technical spirit of the present disclosure, and those skilled in the art to which the present disclosure pertains will appreciate that various changes and modifications are possible without departing from the essential characteristic of the present disclosure. Therefore, the embodiments of the present disclosure are provided for illustrative purposes only but not intended to limit the technical concept of the present disclosure. The technical spirit of the present disclosure is not limited thereto. The protective scope of the present disclosure should be construed based on the following claims, and all the technical spirit in the equivalent scope thereto should be construed as falling within the scope of the present disclosure.

What is claimed is:

1. An apparatus for monitoring a space using a three-dimensional acoustic web, the apparatus comprising:
   an acoustic emitting unit configured to emit a plurality of emitted acoustic signals to a monitoring target space, wherein the acoustic emitting unit includes a plurality of acoustic emitters emitting the plurality of emitted acoustic signals;
   an acoustic control unit configured to control emission of the plurality of emitted acoustic signals from the acoustic emitting unit to form a three-dimensional acoustic web in the monitoring target space by interference between the plurality of emitted acoustic signals, wherein the three-dimensional acoustic web includes a plurality of constructive interference nodes and a plurality of destructive interference nodes, each destructive interference node of the plurality of destructive interference nodes and each constructive interference node of the plurality of constructive interference nodes are alternately arranged;
   an acoustic receiving unit configured to receive an acoustic signals from the monitoring target space; and
   a situation determination unit configured to recognize a situation of the monitoring target space based on a characteristic of the received acoustic signals.

2. The apparatus of claim 1,
   wherein the situation determination unit measures a change of the characteristic of the received the received acoustic signal, and the situation determination unit determines a change in a situation of the monitoring target space based on the measured change of the characteristic of the received acoustic signal.

3. The apparatus of claim 1,
   wherein the acoustic control unit is configured to control the plurality of acoustic signals to emit the acoustic signal with a plurality of frequencies.

4. The apparatus of claim 1,
   wherein the acoustic control unit adjusts one or more of an emission duration of the plurality of emitted acoustic signals, an emission time interval, an emission direction, a number of frequencies emitted simultaneously, a value of frequencies emitted simultaneously, an amount of change in emission frequency over time, a phase of emitted acoustic signals, and a spacing distance between a plurality of acoustic emitters based on a space element in relation to the monitoring target space and a detection element in relation to a detection target.

5. The apparatus of claim 1,
   wherein the acoustic control unit is configured to control the plurality of emitted acoustic signals of synthesized sound with a plurality of component frequencies.

6. The apparatus of claim 1,
   wherein the acoustic control unit is configured to control the plurality of acoustic signals to have a single frequency varying over time.

7. The apparatus of claim 1,
   wherein the acoustic emitting unit adjusts a spacing distance between neighboring acoustic emitters of the plurality of acoustic emitters based on a size of a target object in the monitoring target space.

8. The apparatus of claim 1,
   wherein the monitoring target space includes a moving object moving in a first direction,
   wherein the three-dimensional acoustic web includes neighboring destructive interference nodes spaced apart from each other in the first direction, and
   wherein a width, in the first direction, of the moving object is smaller than a spacing, in the first direction, of the neighboring destructive interference nodes.

9. The apparatus of claim 1,
   wherein the characteristic of the received acoustic signal is an acoustic pressure of the received acoustic signal.

10. The apparatus of claim 1,
    wherein the characteristic of the received acoustic signal is a phase of the received acoustic signal.

11. The apparatus of claim 1,
    wherein the acoustic control unit adjusts the interference between the plurality of emitted acoustic signals in consideration of any one or more of space elements and detection elements to form the three-dimensional acoustic web.

12. The apparatus of claim 1,
    wherein the situation determination unit measures a frequency response of the monitoring target space using the received acoustic signal, and
    wherein the situation determination unit determines a change in a situation of the monitoring target space based on a change pattern of the measured frequency response.

13. The apparatus of claim 12,
    wherein the frequency response of the monitoring target space includes an acoustic pressure for each frequency of the received acoustic signal.

14. The apparatus of claim 12,
    wherein the frequency response of the monitoring target space includes a phase change for each frequency of the received acoustic signal.

15. A method of monitoring a space using a three-dimensional acoustic web, the method comprising:

an acoustic signal emitting step of emitting a plurality of emitted acoustic signals to a monitoring target space, wherein the plurality of emitted acoustic signals are emitted from a plurality of acoustic emitters;

an acoustic web forming step of forming a three-dimensional acoustic web in the monitoring target space by interference between the plurality of emitted acoustic signals, wherein the three-dimensional acoustic web includes a plurality of constructive interference nodes and a plurality of destructive interference nodes, each destructive interference node of the plurality of destructive interference nodes and each constructive interference node of the plurality of constructive interference nodes are alternately arranged;

an acoustic signal receiving step of receiving an acoustic signals from the monitoring target space; and a space situation determination step of determining a situation of the monitoring target space based on a characteristic of the received acoustic signals.

16. The method of claim 15, wherein the space situation determination step measures a change of the characteristic of the received acoustic signals, and the space situation determination step determines a change in a situation of the monitoring target space based on the measured change of the characteristic of the received acoustic signal.

17. The method of claim 15, wherein the acoustic signal emitting step emits the plurality of emitted acoustic signals to the monitoring target space by adjusting one or more of an emission duration of the acoustic signal, an emission time interval, an emission direction, a number of frequencies emitted simultaneously, a value of frequencies emitted simultaneously, an amount of change in emission frequency over time, a phase of emitted acoustic signals, and a spacing distance between a plurality of acoustic emitters based on a space element in relation to the monitoring target space and a detection element in relation to a detection target.

18. The method of claim 15, wherein the space situation determination step measures a frequency response of the monitoring target space using the received acoustic signal, and the space situation determination step determines a change in situation of the monitoring target space based on a change pattern of the measured frequency response.

19. The method of claim 15, wherein the acoustic signal emitting step emits the acoustic signal having a single frequency varying over time.

20. The method of claim 15, wherein the acoustic signal emitting step emits the acoustic signal of synthesized sound with a plurality of component frequencies.

\* \* \* \* \*